United States Patent [19]
Nagashima et al.

[11] Patent Number: 5,858,896
[45] Date of Patent: Jan. 12, 1999

[54] ULTRAVIOLET AND INFRARED RADIATION ABSORBING GLASS

[75] Inventors: Yukihito Nagashima; Shigekazu Yoshii, both of Osaka, Japan

[73] Assignee: Nippon Sheet Glass Co., Ltd., Osaka, Japan

[21] Appl. No.: 941,542

[22] Filed: Sep. 30, 1997

[30] Foreign Application Priority Data

Oct. 1, 1996 [JP] Japan .................................. 8-260376

[51] Int. Cl.$^6$ ............................ C03C 3/087; C03C 3/095; C03C 4/02
[52] U.S. Cl. ................................ 501/66; 501/64; 501/70; 501/904; 501/905
[58] Field of Search ................................ 501/66, 70, 68, 501/65, 904, 64

[56] References Cited

U.S. PATENT DOCUMENTS

| 5,039,631 | 8/1991 | Krashkevich et al. ................. 501/65 |
| 5,077,133 | 12/1991 | Cheng ....................................... 501/64 |

FOREIGN PATENT DOCUMENTS

| 0488110A1 | 6/1992 | European Pat. Off. . |
| 070934A1 | 5/1996 | European Pat. Off. . |

OTHER PUBLICATIONS

Database WPI Section Ch, Week 9248 Derwent Publications Ltd., London, GB; Class L01, AN 92–397080 XP002051343 & SU 1 706 979 A (Chenyatinsk Glas Wks), 23 Jan. 1992 * Abstract; examples 3–5 *.

Database WPI Section Ch, Week 9002 Derwent Publications Ltd., London, GB; Class L01, AN 90–014293 XP002051344–& SU 1 470 679 A (Gusev Glass Res Inst), 7 Apr. 1989 * abstract; examples 2, 4, 6 *.

*Primary Examiner*—Michael Marcheschi
*Attorney, Agent, or Firm*—Sughrue, Mion, Zinn, Macpeak & Seas, PLLC

[57] ABSTRACT

An ultraviolet and infrared radiation absorbing glass having excellent ultraviolet radiation absorbing power and green tint, which is suitably used as a window glass for automobiles and constructional materials. The glass comprises, in % by weight: basic glass components comprising 65 to 80% $SiO_2$, 0 to 5% $Al_2O_3$, 0 to 10% MgO, 5 to 15% CaO, 10 to 18% $Na_2O$, 0 to 5% $K_2O$, 5 to 15% MgO+CaO, 10 to 20% $Na_2O+K_2O$, and 0 to 5% $B_2O_3$, and coloring components comprising 0.4 to 1.5% total iron oxide (T-$Fe_2O_3$) in terms of $Fe_2O_3$, 0 to 3.0% $CeO_2$, 0 to 2.0% $TiO_2$, and 0.025 to 6.0% $La_2O_3$, wherein 25 to 40% of said T-$Fe_2O_3$ in terms of $Fe_2O_3$ is FeO.

12 Claims, No Drawings

ULTRAVIOLET AND INFRARED RADIATION ABSORBING GLASS

FIELD OF THE INVENTION

The present invention relates to an ultraviolet and infrared radiation absorbing glass having a green tint. More specifically, it relates to an ultraviolet and infrared radiation absorbing glass which is used as a glass for automobiles.

BACKGROUND OF THE INVENTION

In order to meet the demand for the protection of interior trim of automobiles against deterioration, which has been increasing with the recent trend to luxury of the interior trim, and to reduce the load of air conditioning, a green-tinted glass having ultraviolet and infrared radiation absorbing power has recently been proposed as window glass of automobiles.

For example, there has been known a green-tinted glass having an ultraviolet transmission reduced to about 38% or less and a total solar energy transmission reduced to about 46% or less while maintaining a visible light transmission of at least 70% for securing the vision from the inside of automobiles. There is a recent trend that a bluish green tint is preferred for such a green-tinted glass for automobiles.

It is known that the total solar energy transmission can be decreased by increasing the absolute amount of ferrous oxide (FeO) of the iron oxides introduced into a glass. Almost all of the conventional infrared radiation absorbing glasses have used this method.

On the other hand, various methods have conventionally been proposed as methods for decreasing ultraviolet transmission. For example, an infrared and ultraviolet radiation absorbing glass disclosed in JP-A-4-193738 (the term "JP-A" as used herein means an "unexamined published Japanese patent application") contains cerium oxide and titanium oxide. More specifically, the glass comprises, in % by weight, as basic glass components, 68 to 72% $SiO_2$, 1.6 to 3.0% $Al_2O_3$, 8.5 to 11.0% CaO, 2.0 to 4.2% MgO, 12.0 to 16.0% $Na_2O$, and 0.5 to 3.0% $K_2O$, and as coloring components, 0.65 to 0.75% $Fe_2O_3$, 0.20 to 0.35% $CeO_2$ and 0.2 to 0.4% $TiO_2$.

The green-tinted ultraviolet radiation absorbing glass disclosed in JP-A-6-564668 comprises, in % by weight, basic glass components of soda-lime-silica glass and having incorporated therein 0.53 to 0.70% total iron oxide in terms of $Fe_2O_3$, 0.5 to 0.8% $CeO_2$, and 0.2 to 0.4% $TiO_2$ as coloring components, wherein 30 to 40% of the total iron oxide in terms of $Fe_2O_3$ is FeO.

Further, the green-tinted ultraviolet and infrared radiation absorbing glass disclosed in JP-B-6-88812 (the term "JP-B" as used herein means an "examined published Japanese patent application") comprises, in % by weight, as basic glass components, 65 to 75% $SiO_2$, 0 to 3% $Al_2O_3$, 1 to 5% MgO, 5 to 15% CaO, 10 to 15% $Na_2O$, and 0 to 4% $K_2O$, and as coloring components, 0.65 to 1.25% total iron oxide in terms of $Fe_2O_3$, 0.2 to 1.4% $CeO_2$, or 0.1 to 1.36% $CeO_2$ and 0.02 to 0.85% $TiO_2$.

Because cerium oxide is expensive, an ultraviolet and infrared radiation absorbing glass having a decreased cerium oxide content has also been proposed.

For example, JP-A-4-231347 discloses a green-tinted ultraviolet radiation absorbing glass having a basic glass composition of soda-lime-silica glass and further containing, in % by weight, as coloring components, more than 0.85% total iron oxide (T-$Fe_2O_3$) in terms of $Fe_2O_3$, with a FeO/T-$Fe_2O_3$ ratio smaller than 0.275, and less than 0.5% $CeO_2$.

The above-described conventional ultraviolet and infrared radiation absorbing glasses have an ultraviolet radiation absorbing power imparted by ultraviolet absorption due to $Fe_2O_3$, $CeO_2$ and $TiO_2$ and interactions among them. Of these components, it is $CeO_2$ that can enhance the ultraviolet radiation absorbing power best without giving a yellowish tint unfavorable as a glass for automobiles. However, $CeO_2$ is expensive. Therefore, in order to minimize the amount of $CeO_2$ used, compositions are controlled such that the $CeO_2$ content is decreased and the decreased ultraviolet radiation absorbing power corresponding to such a decreased amount is compensated for by using $Fe_2O_3$ and $TiO_2$. However, the ultraviolet absorption of $Fe_2O_3$ or the interaction between $TiO_2$ and FeO is extended over the visible light region. Therefore, if one tries to increase the ultraviolet absorption of a glass, the transmission of visible light in the short wavelength region is also decreased, so that the glass has a yellowish tint.

SUMMARY OF THE INVENTION

The present invention has been made in light of the above-described problems associated with the conventional techniques.

Accordingly, an object of the invention is to provide a green-tinted ultraviolet and infrared radiation absorbing glass at a low cost which has high ultraviolet and infrared radiation absorbing power and is free from yellowing that is unfavorable for use in automobiles.

The ultraviolet and infrared radiation absorbing glass according to the present invention comprises, in % by weight:

basic glass components comprising
    65 to 80% $SiO_2$,
    0 to 5% $Al_2O_3$,
    0 to 10% MgO,
    5 to 15% CaO,
    10 to 18% $Na_2O$,
    0 to 5% $K_2O$,
    5 to 15% MgO+CaO,
    10 to 20% $Na_2O$+$K_2O$, and
    0 to 5% $B_2O_3$, and
coloring components comprising
    0.4 to 1.5% total iron oxide (T-$Fe_2O_3$) in terms of $Fe_2O_3$,
    0 to 3.0% $CeO_2$,
    0 to 2.0% $TiO_2$, and
    0.025 to 6.0% $La_2O_3$,
wherein 25 to 40% of said T-$Fe_2O_3$ in terms of $Fe_2O_3$ is FeO.

In the above embodiment, when the glass has thickness of 4.75 to 6.25 mm, the ultraviolet and infrared radiation absorbing glass of the present invention preferably comprises, in % by weight: 0.45 to 0.65% T-$Fe_2O_3$ in terms of $Fe_2O_3$.

In another preferred embodiment, when the glass has thickness of 3.25 to 4.0 mm, the ultraviolet and infrared radiation absorbing glass of the present invention preferably comprises, in % by weight: 0.55 to 1.0% T-$Fe_2O_3$ in terms of $Fe_2O_3$, more preferably, 0.55 to 0.85% T-$Fe_2O_3$ in terms of $Fe_2O_3$.

Further, it is preferable that the glass comprises 0.5 to 2.0% $CeO_2$ and 0.05 to 1.5% $La_2O_3$, wherein 30 to 40% of the T-$Fe_2O_3$ in terms of $Fe_2O_3$ is FeO.

The ultraviolet and infrared radiation absorbing glass of the present invention preferably has a visible light transmission of 70% or more, as measured in a wavelength region of 380 to 770 nm with the CIE standard illuminant A; a dominant wavelength of 495 to 535 nm and an extinction purity of 1.5 to 3.5% as measured in a wavelength region of 380 to 770 nm with the CIE standard illuminant C; a total solar energy transmission of less than 50% as measured in a wavelength region of 300 to 2100 nm; and a total ultraviolet transmission of less than 12% as measured according to ISO 9050, when the glass has a thickness of 3.25 to 6.25 mm.

DETAILED DESCRIPTION OF THE INVENTION

The reasons for limitations of the glass composition of the ultraviolet and infrared radiation absorbing glass according to the present invention are explained below. Hereinafter, all percents are by weight.

$SiO_2$ is a main component forming the skeleton of glass. If the $SiO_2$ content is less than 65%, the glass has poor durability. If the content exceeds 80%, it is difficult to melt the glass composition.

$Al_2O_3$ serves to improve the durability of glass. If the $Al_2O_3$ content exceeds 5%, it is difficult to melt the glass composition. A preferred $Al_2O_3$ content is from 0.1 to 2%.

MgO and CaO both serve to improve the durability of glass and to control the liquidus temperature and viscosity of a glass composition when forming a glass. If the MgO content exceeds 10%, the liquidus temperature rises. If the CaO content is less than 5% or higher than 15%, the liquidus temperature rises. If the total content of MgO and CaO is less than 5%, the durability of the resulting glass deteriorates. If the total content exceeds 15%, the liquidus temperature rises.

$Na_2O$ and $K_2O$ are used as a glass melting accelerator. If the $Na_2O$ content is less than 10%, or if the total content of $Na_2O$ and $K_2O$ is less than 10%, the effect of melting acceleration is poor. If the $Na_2O$ content exceed 18%, or if the total content of $Na_2O$ and $K_2O$ exceeds 20%, the durability of glass decreases. It is not preferable that the $K_2O$ exceeds 5%, because it is more expensive than $Na_2O$.

While $B_2O_3$ is a component generally used for improvement of the durability of glass or as a melting aid, it also functions to enhance ultraviolet absorption. If the $B_2O_3$ content exceeds 5%, exertion of the ultraviolet transmission decreasing effect is extended to the visible region, so that not only does the tint tend to be yellowish, but also disadvantages occur in forming a glass due to volatilization of $B_2O_3$ and the like. Accordingly, the upper limit of the $B_2O_3$ content should be 5.0%.

Iron oxide is present in glass in the form of $Fe_2O_3$ ($Fe^{3+}$) and FeO ($Fe^{2+}$). $Fe_2O_3$ is a component which serves to enhance ultraviolet absorption together with $CeO_2$ and $TiO_2$, and FeO is a component which serves to enhance the absorption of heat rays.

Where the total iron oxide (T-$Fe_2O_3$) content is within the range of from 0.4 to 1.5%, the FeO/T-$Fe_2O_3$ ratio is preferably in the range of from 0.25 to 0.40 in order to obtain desired total solar energy absorption. In the above ratio, the FeO content is usually expressed in terms of $Fe_2O_3$ content. When the thickness of the glass is from 4.75 to 6.25 mm, the total iron oxide content preferably is from 0.45 to 0.65%, and in this embodiment, the FeO/T-$Fe_2O_3$ ratio is preferably in the range of from 0.25 to 0.40.

When the thickness of the glass is from 3.25 to 4.00 mm, the total iron content preferably is from 0.55 to 1.0%, and in this embodiment, the FeO/T-$Fe_2O_3$ ratio is preferably 0.30 to 0.40.

$CeO_2$ is a component which serves to enhance ultraviolet radiation absorbing power, and is present in glass in the form of $Ce^{3+}$ or $Ce^{4+}$. Especially, $Ce^{3+}$ is effective in ultraviolet absorption because of having a small amount of absorption in the visible light region. If the $CeO_2$ content is too large, the absorption in the short wavelength side of the visible light region is too large, and the glass becomes yellowish, and at the same time, the cost of the glass extremely increases. Therefore, the $CeO_2$ content is 3.0% or less. In order to obtain a further desirable ultraviolet radiation absorbing power and tint, the $CeO_2$ is preferably used in an amount of 0.5 to 2.0%.

$La_2O_3$ is effective not only in decreasing the viscosity of the glass but also in accelerating the melting of the glass. Further, it also improves the chemical durability of the glass, such as water resistance. It has been found that the ultraviolet transmission is decreased by adding $La_2O_3$ to the glass containing $Fe_2O_3$ and $CeO_2$. If the glass containing $Fe_2O_3$ and $CeO_2$ is tempered, the ultraviolet transmission and solar energy transmission can be decreased. It has also been found that such an effect can be enhanced by the addition of $La_2O_3$. Although the detailed mechanism of this effect is not yet clarified, it can be considered that when $La^{3+}$ is introduced into the glass, it distorts the structure around ions such as $Ce^{3+}$, $Fe^{3+}$ and $Fe^{2+}$, because of the large ion radius of $La^{3+}$, so that each ion absorption is increased. When the $La_2O_3$ content is less than 0.025%, such an effect is insufficient. If the content exceeds 6.0%, the specific gravity of the glass is too high so that problems may arise, for example, that the molten glass is difficult to be replaced with other glasses at the time of the production. The preferable $La_2O_3$ content is 0.05 to 1.5%. $La_2O_3$ can be added in the form of a raw material containing a high concentration of $La_2O_3$. However, such a raw material is required to be refined, resulting in increasing cost. In view of lowering the cost of the raw material, it is preferable that $La_2O_3$ is added in the form of a mixture with $CeO_2$ which is produced together with $La_2O_3$ and which is not separated or in the form of an impurity remaining in $CeO_2$ having a low degree of purification.

$TiO_2$, while not essential, can be added in order to enhance ultraviolet radiation absorbing power in such a small amount that does not impair the optical characteristics intended in the present invention. The upper limit of the $TiO_2$ content is 2.0%, preferably 0.5%, and more preferably 0.2%. If the $TiO_2$ content exceeds the upper limit, the glass tends to be yellow-tinted.

The glass having the above-described composition may further contain other coloring components, e.g., CoO, NiO, MnO, $V_2O_5$, $MnO_3$, etc., and $SnO_2$ as a reducing agent in a total amount of 0 to 1%, so long as the green tint intended in the present invention is not impaired. In particular, CoO gives a blue tint and is therefore effective in preventing the glass from being yellow-tinted due to $Fe_2O_3$, $CeO_2$ or $TiO_2$ added in increased amounts. A preferred amount of CoO added is from 3 to 20 ppm.

The ultraviolet and infrared radiation absorbing glass according to the present invention has a green tint and exhibits high ultraviolet absorption, high infrared absorption, and high visible light transmission, especially high ultraviolet absorption.

The present invention will now be described in more detail by reference to the following Examples, but it should be understood that the invention is not construed as being limited thereto. Unless otherwise indicated, all parts, percents, ratios and the like are by weight.

EXAMPLES 1 TO 3

A typical soda-lime-silica glass batch was appropriately compounded with ferric oxide, titanium oxide, cerium oxide, and a carbonaceous material as a reducing agent. In Example 1, $La_2O_3$ was added in a given amount by using cerium oxide containing about 5% of $La_2O_3$ as a raw material of cerium oxide. In Example 2, a mixture containing $CeO_2$ and $La_2O_3$ at a weight ratio of about 5:3 was used as a raw material of $CeO_2$ and $La_2O_3$. In Example 3, this mixture was added until the $CeO_2$ content reached a given amount and a deficient amount of $La_2O_3$ was added in the form of lanthanum oxide. These raw materials were melted at 1,500° C. for 4 hours in an electric furnace. The molten glass was cast on a stainless steel plate and annealed to obtain a glass plate having a thickness of about 10 mm. The resulting glass plate was cut into a square having a size of 10 cm, and then polished so as to have a given thickness, The polished glass was heated to about 660° C. in the electric furnace, and the heated glass was then taken out of the furnace and tempered under ordinary conditions. Regarding the tempered glass thus obtained, a visible light transmission (YA) measured with the CIE standard the illuminant A, a total solar energy transmission (TG), an ultraviolet transmission (Tuv), and a dominant wavelength (Dw) measured with the CIE standard illuminant C, and an excitation purity (Pe) were obtained.

Table 1 shown below shows $T-Fe_2O_3$ concentration, FeO (in terms of $T-Fe_2O_3$)/$T-Fe_2O_3$ ratio, $TiO_2$ concentration, $CeO_2$ concentration, $La_2O_3$ concentration, and optical characteristics of the samples. In Table 1, concentrations are all % by weight.

TABLE 1

|  | Example 1 | Example 2 | Example 3 |
| --- | --- | --- | --- |
| $T-Fe_2O_3$ | 0.55 | 0.63 | 0.63 |
| $FeO/T-Fe_2O_3$ | 0.31 | 0.34 | 0.33 |
| $TiO_2$ | 0.11 | 0.15 | 0.03 |
| $CeO_2$ | 1.50 | 1.70 | 1.00 |
| $La_2O_3$ | 0.075 | 1.00 | 5.00 |
| Thickness (nm) | 5.0 | 4.0 | 3.5 |
| YA (%) | 74.5 | 73.5 | 75.9 |
| TG (%) | 47.5 | 44.4 | 49.7 |
| Tuv (%) | 8.6 | 7.1 | 9.7 |
| Dw (nm) | 507 | 515 | 525 |
| Pe (%) | 2.8 | 2.1 | 1.7 |

As is apparent from Table 1, the sample, the glass according to the Examples having a thickness of 3.25 to 6.25 mm, has optical characteristics that a visible light transmission (YA) is 70% or more as measured with the CIE standard illuminant A, a dominant wavelength (DW) is 495 to 535 nm, an excitation purity (Pe) is 1.5 to 3.5% as measured with the CIE standard illuminant C, a total solar energy transmission (TG) is less than 50%, and an ultraviolet transmission (TUV) defined according to ISO 9050 is less than 12%.

COMPARATIVE EXAMPLES 1 TO 3

Comparative Examples to the present invention are shown in Table 2 below. Comparative Examples 1 to 3 show examples having the compositions corresponding to those of Examples 1 to 3 except that $La_2O_3$ was not included.

TABLE 2

|  | Comparative Example 1 | Comparative Example 2 | Comparative Example 3 |
| --- | --- | --- | --- |
| $T-Fe_2O_3$ | 0.55 | 0.63 | 0.63 |
| $FeO/T-Fe_2O_3$ | 0.31 | 0.34 | 0.33 |
| $TiO_2$ | 0.11 | 0.15 | 0.03 |
| $CeO_2$ | 1.50 | 1.70 | 1.00 |
| $La_2O_3$ | 0 | 0 | 0 |
| Thickness (nm) | 5.0 | 4.0 | 3.5 |
| YA (%) | 74.7 | 73.8 | 76.2 |
| TG (%) | 47.6 | 44.5 | 49.8 |
| Tuv (%) | 9.1 | 8.1 | 12.5 |
| Dw (nm) | 504 | 510 | 503 |
| Pe (%) | 3.1 | 2.5 | 2.7 |

It can be seen from the results shown in Tables 1 and 2 above that by containing $La_2O_3$, an ultraviolet transmission was decreased and an ultraviolet absorption was increased.

In order to examine chemical durability of the glass of Examples 2 and 3 and Comparative Examples 2 and 3, the glass was placed into a constant temperature and humidity bath kept at 80° C. under the condition of saturated humidity. After 200 hours, the glass was taken out of the bath and cooled. The reflectance of the cooled glass was determined, and the difference of the reflectance before or after introducing into the bath was determined. According to this method, since the reflectance is decreased when the glass surface is modified, the modification of the glass can be conveniently evaluated based on the degree of decrease in the reflectance. The reflectance of each glass is shown in Table 3 below.

TABLE 3

|  | Change of reflectance (%) |
| --- | --- |
| Example 2 | −0.80 |
| Example 3 | −0.41 |
| Comparativw Example 2 | −1.40 |
| Comparative Example 3 | −1.98 |

As is apparent from the results shown in Table 3 above, the glass of the Examples has a decreased reflectance smaller than that of the Comparative Examples, so that the surface of such a glass is difficult to be modified. That is, it can be seen that the glass of the Examples has a high chemical durability.

As described in detail above, the present invention can provide an ultraviolet and infrared radiation absorbing glass having a high visible light transmission and excellent ultraviolet radiation absorbing power without yellowing the tint, and also having an excellent chemical durability.

Further, according to the ultraviolet and infrared radiation absorbing glass of the present invention, $CeO_2$ and $La_2O_3$ can be added in the form of an inexpensive raw material having a low degree of purification. Thus, an ultraviolet and infrared radiation absorbing glass having excellent ultraviolet radiation absorbing power and chemical durability can be produced at low cost.

While the invention has been described in detail and with reference to specific examples thereof, it will be apparent to one skilled in the art that various changes and modifications can be made therein without departing from the scope thereof.

What is claimed is:

1. An ultraviolet and infrared radiation absorbing glass comprising, in % by weight:

basic glass components comprising
- 65 to 80% $SiO_2$,
- 0 to 5% $Al_2O_3$,
- 0 to 10% MgO,
- 5 to 15% CaO,
- 10 to 18% $Na_2O$,
- 0 to 5% $K_2O$,
- 5 to 15% MgO+CaO,
- 10 to 20% $Na_2O+K_2O$, and
- 0 to 5% $B_2O_3$, and coloring components consisting essentially of
- 0.4 to 1.5% total iron oxide (T-$Fe_2O_3$) in terms of $Fe_2O_3$,
- 0 to 3.0% $CeO_2$,
- 0 to 2.0% $TiO_2$, and
- 0.025 to 6.0% $La_2O_3$, wherein 25 to 40% of said T-$Fe_2O_3$ in terms of $Fe_2O_3$ is FeO.

2. The ultraviolet and infrared radiation absorbing glass as claimed in claim 1, wherein the total iron oxide (T-$Fe_2O_3$) content in terms of $Fe_2O_3$ is 0.45 to 0.65%, and the $CeO_2$ content is 0.5 to 2.0%.

3. The ultraviolet and infrared radiation absorbing glass as claimed in claim 1, wherein the total iron oxide (T-$Fe_2O_3$) content in terms of $Fe_2O_3$ is 0.55 to 1.0%, and the $CeO_2$ content is 0.5 to 2.0%.

4. The ultraviolet and infrared radiation absorbing glass as claimed in claim 1, wherein the total iron oxide (T-$Fe_2O_3$) content in terms of $Fe_2O_3$ is 0.55 to 0.85%.

5. The ultraviolet and infrared radiation absorbing glass as claimed in claim 3, wherein the total iron oxide (T-$Fe_2O_3$) content in terms of $Fe_2O_3$ is 0.55 to 0.85%.

6. The ultraviolet and infrared radiation absorbing glass as claimed in claim 1, wherein 30 to 40% of the T-$Fe_2O_3$ in terms of $Fe_2O_3$ is FeO.

7. The ultraviolet and infrared radiation absorbing glass as claimed in claim 1, wherein the $La_2O_3$ content is 0.05 to 1.5%.

8. The ultraviolet and infrared radiation absorbing glass as claimed in claim 1, wherein said glass has a visible light transmission of 70% or more as measured with the CIE standard illuminant A, when said glass has a thickness of 3.25 to 6.25 mm.

9. The ultraviolet and infrared radiation absorbing glass as claimed in claim 1, wherein said glass has a dominant wavelength of 495 to 535 nm as measured with the CIE standard illuminant C, when said glass has a thickness of 3.25 to 6.25 mm.

10. The ultraviolet and infrared radiation absorbing glass as claimed in claim 1, wherein said glass has an ultraviolet transmission defined in ISO 9050 of less than 12%, when said glass has a thickness of 3.25 to 6.25 mm.

11. The ultraviolet and infrared radiation absorbing glass as claimed in claim 1, wherein said glass has a solar energy transmission of less than 50%, when said glass has a thickness of 3.25 to 6.25 mm.

12. The ultraviolet and infrared radiation absorbing glass as claimed in claim 1, wherein said glass has an excitation purity of 1.5 to 3.5% as measured with the CIE standard illuminant C, when said glass has a thickness of 3.25 to 6.25 mm.

* * * * *